(12) United States Patent
Ahn et al.

(10) Patent No.: US 9,013,211 B2
(45) Date of Patent: Apr. 21, 2015

(54) HEAD LAMP SYSTEM

(75) Inventors: Byoung Suk Ahn, Suwon-si (KR); Hoo Taek Cho, Yongin-si (KR); Hak Bong Kim, Daegu (KR); Sun Kyoung Park, Pohang-si (KR)

(73) Assignees: Hyundai Motor Company, Seoul (KR); SL Lighting Corporation, Daegu (KR)

( * ) Notice: Subject to any disclaimer, the term of this patent is extended or adjusted under 35 U.S.C. 154(b) by 568 days.

(21) Appl. No.: 13/479,008

(22) Filed: May 23, 2012

(65) Prior Publication Data
US 2013/0119862 A1    May 16, 2013

(30) Foreign Application Priority Data

Nov. 11, 2011   (KR) .................. 10-2011-0117852

(51) Int. Cl.
*B60Q 1/26* (2006.01)
*B60Q 1/14* (2006.01)

(52) U.S. Cl.
CPC ............ *B60Q 1/143* (2013.01); *B60Q 2300/45* (2013.01); *B60Q 2300/112* (2013.01)

(58) Field of Classification Search
USPC ..................................... 315/79, 82
See application file for complete search history.

(56) References Cited

U.S. PATENT DOCUMENTS

| 6,293,686 B1 * | 9/2001 | Hayami et al. ................. 362/465 |
| 7,586,405 B1 * | 9/2009 | Brandenburg ................. 340/468 |

FOREIGN PATENT DOCUMENTS

| JP | 2013103711 A | * | 5/2013 |
| KR | 1998-055416 A | | 9/1998 |
| KR | 10-1999-0027676 A | | 4/1999 |
| KR | 10-0301405 B1 | | 9/2001 |
| KR | 10-2003-0072684 A | | 9/2003 |
| KR | 10-2004-0032155 A | | 4/2004 |
| KR | 10-2011-0005034 A | | 1/2011 |

* cited by examiner

*Primary Examiner* — Ryan Jager
(74) *Attorney, Agent, or Firm* — Morgan, Lewis & Bockius LLP

(57) ABSTRACT

A head lamp system may include a head lamp that may be provided with a headlight and a spotlight unit including a plurality of optical modules having different irradiation regions in front of a vehicle, wherein an optical module of the plurality of optical modules, which has a irradiation region that corresponds to a position of an obstacle in front of the vehicle, blinks, and a blink period of the optical module may be changed according to a vehicle speed.

9 Claims, 11 Drawing Sheets

(Ralated Art)

(Ralated Art)

HEAD LAMP SYSTEM

CROSS-REFERENCE TO RELATED APPLICATION

The present application claims priority to Korean Patent Application No. 10-2011-0117852, filed on Nov. 11, 2011 in the Korean Intellectual Property Office, the entire contents of which is incorporated herein for all purposes by this reference.

BACKGROUND OF THE INVENTION

1. Field of the Invention

The present invention relates to a head lamp system which senses obstacles in front of a vehicle at night and irradiates spotlight onto the obstacles. More particularly, the present invention relates to a head lamp system which can improve visibility that is a driver's ability to visually recognize an obstacle during the nighttime driving through changing a blink period of a spotlight according to a driving speed of a vehicle.

2. Description of Related Art

Recently, a head lamp system enables a driver to visually recognize an obstacle through irradiation of light onto a region in which the obstacle is present if such an obstacle is found during the nighttime driving.

Specifically, a head lamp system disclosed in Japanese Unexamined Patent Publication No. 2010-095205, as illustrated in FIG. 1, includes a headlight 2 irradiating beams in a front direction of a vehicle at night, and a spotlight unit 3 arranged on a side portion of the headlight 2. In this spotlight unit 3, a plurality of optical modules R1 to R6 are provided, which have respective irradiation regions in the front direction of the vehicle as illustrated in FIG. 2.

In the case of recognizing an obstacle such as a pedestrian or the like in front of the vehicle, the head lamp system in the related art irradiates beams onto the obstacle through turning on the optical module that corresponds to the region in which the obstacle is present, and thus a driver recognizes the obstacle. If the sensed obstacle is a pedestrian, the head lamp system turns on the optical module that flashes on the corresponding region, while if the sensed obstacle is a vehicle, the head lamp system turns off the optical module, and thus the driver can recognize the obstacle.

However, since the head lamp system in the related art recognizes the obstacle by means of a simple operation such as turning-on of the corresponding optical module of the spotlight unit, it may not raise driver's awareness. Due to this, the driver's visibility with respect to the obstacle is degraded, and thus the function of the spotlight unit of the head lamp system may not be appropriately utilized.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a head lamp system which can improve driver's visibility with respect to an obstacle that is present in front of a vehicle during the nighttime driving.

In one aspect of the present invention, there is provided a head lamp system which may include a head lamp that is provided with a headlight and a spotlight unit including a plurality of optical modules having different irradiation regions in front of a vehicle, wherein the optical module of the plurality of optical modules having the irradiation region that corresponds to a position of an obstacle in front of the vehicle blinks, and a blink period of the optical module is changed according to a vehicle speed. According to this configuration, the surroundings are visually evoked through blinking beams, and thus the visibility of the obstacle is heightened. Further, as the blink period of the optical module is changed according to the vehicle speed, the driver's visibility is heightened regardless of the vehicle speed.

In the head lamp system according to the aspect of the present invention, the blink period of the optical module of the spotlight unit may be in proportion to the vehicle speed, and the number of blinks may be the same.

In the head lamp system according to the aspect of the present invention, the blink period and the number of blinks of the optical module of the spotlight unit may be in proportion to the vehicle speed.

In the head lamp system according to the aspect of the present invention, the blink period of the optical module of the spotlight unit may be constant in a low-speed section and/or in a high-speed section.

According to the head lamp system according to an exemplary embodiment of the present invention, by sensing the position of the obstacle that is present in a front direction of the vehicle during the nighttime driving and making beams blink with respect to the irradiation region that corresponds to the sensed position, the driver can recognize the presence of the obstacle more efficiently.

Further, according to the head lamp system according to an exemplary embodiment of the present invention, by changing the blink period of the beams irradiated onto the position in which the obstacle is present according to the vehicle speed, the driver can easily recognize the obstacle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
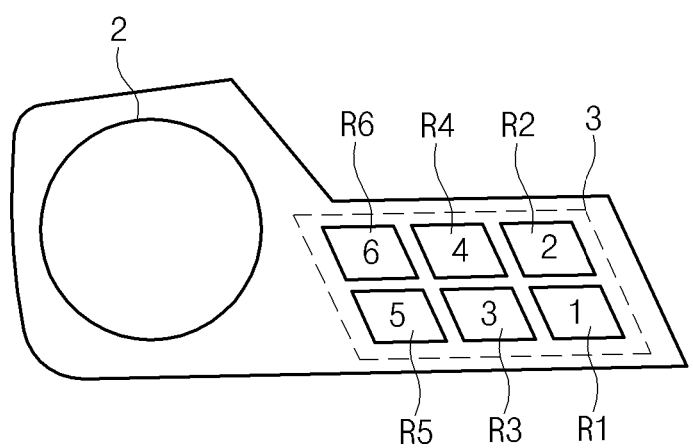
FIG. 1 is a view illustrating a head lamp of a head lamp system in the related art.
Figure 2:
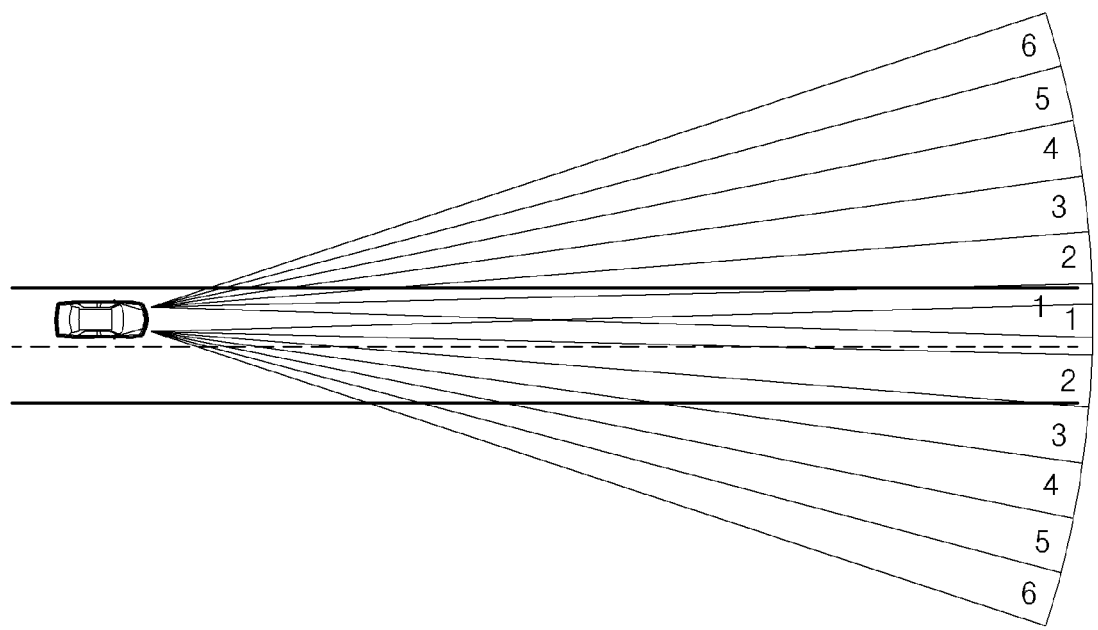
FIG. 2 is a view explaining the operation of a head lamp system in the related art illustrated in FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a head lamp system according to exemplary embodiments of the present invention will be described with reference to the accompanying drawings.

Figure 3:
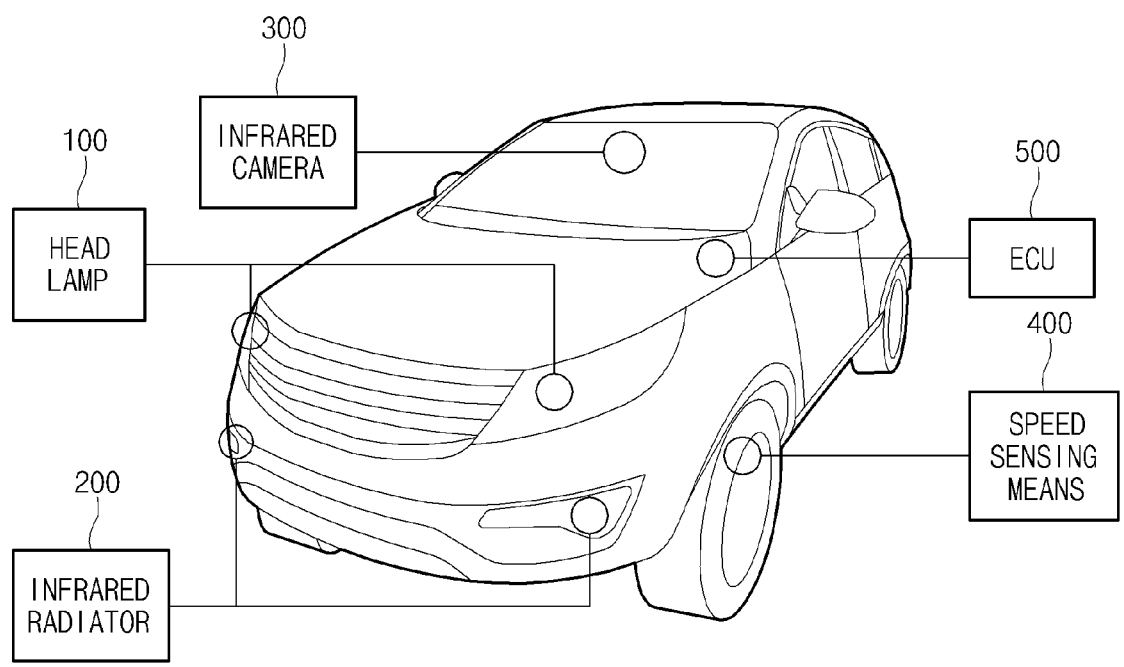
FIG. 3 is a view illustrating a head lamp system according to an exemplary embodiment of the present invention.

Referring to FIG. 3, a head lamp system according to an exemplary embodiment of the present invention includes a head lamp 100, an infrared radiator 200, an infrared camera 300, a speed sensing means 400, and a control unit 500.

Figure 4:
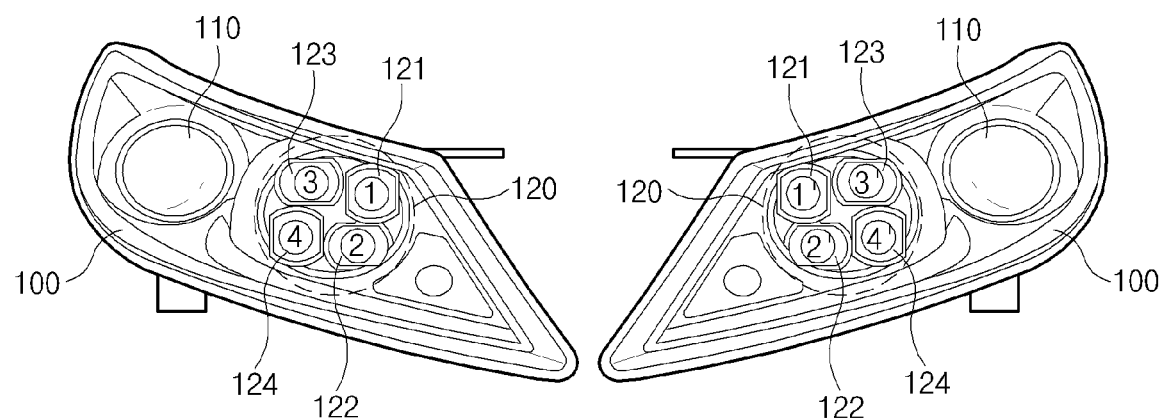
FIG. 4 is a view illustrating a head lamp in FIG. 3.
Figure 5:
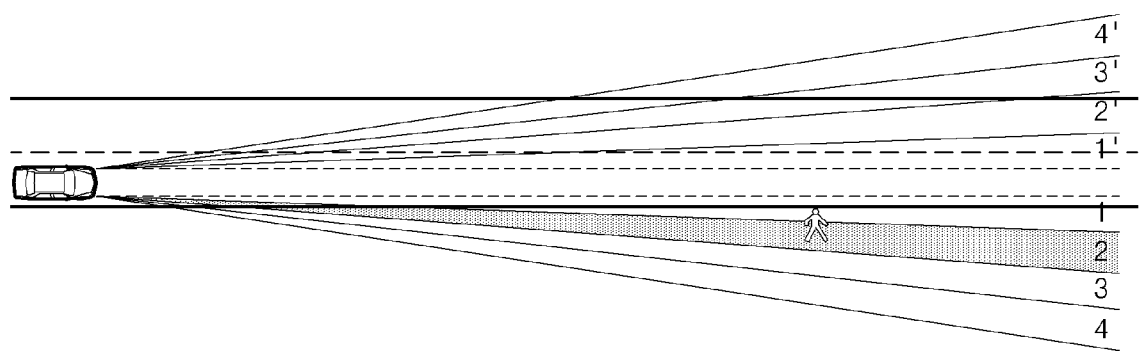
FIG. 5 is a view explaining the operation of a head lamp system according to an exemplary embodiment of the present invention.

The head lamp 100, as illustrated in FIGS. 3 and 4, includes a headlight 110 irradiating beams onto a predetermined region in a front direction of a vehicle at night, and a spotlight unit 120 installed on a side portion of the headlight 110. The spotlight unit 120 includes a plurality of optical modules 121 to 124 (in this embodiment, four optical modules). The beams irradiated from the plurality of optical modules 121 to 124, as illustrated in FIG. 5, have different irradiation regions in the front direction of the vehicle. If an obstacle is recognized in the front direction of the vehicle, the optical module blinks, which has the irradiation region that corresponds to the region in which the obstacle is present. Specifically, as illustrated in FIG. 5, if it is determined that an obstacle is present in irradiation region 2, the optical module 122 that corresponds to the irradiation region 2 blinks.

As illustrated in FIG. 3, the infrared radiator 200 is installed in a front portion of the vehicle to radiate infrared rays. The radiated infrared rays are reflected by the obstacle that is present in front of the vehicle.

As illustrated in FIG. 3, the infrared camera 300 is installed in the front portion of the vehicle, and obtains image data through photographing the front side of the vehicle using the infrared rays radiated from the infrared rays.

The speed sensing means 400 is to sense the speed of the vehicle, and as illustrated in FIG. 3, may be a sensor that senses the revolutions of a vehicle wheel. Further, as the speed of the vehicle, data, which is stored in an ECU that is a central processing unit of the vehicle, may be used as it is.

The control unit 500 is an ECU that controls an electronic device of the vehicle. In an exemplary embodiment of the present invention, the control unit 500 receives an input of image data of the front side of the vehicle that is obtained through the infrared camera 300 and vehicle speed data that is obtained from the speed sensing means 400, and controls the blinking of the spotlight unit 120 of the head lamp 100.

Specifically, the control unit 500 according to an exemplary embodiment of the present invention analyzes the position of the obstacle that is present in the front direction of the vehicle through analysis of the image data that is obtained from the infrared camera 300, and makes the optical module 122 (in FIG. 5) of the optical modules 121 to 124 of the spotlight unit 120, which has the irradiation region that corresponds to the position, blink. That is, the control unit 500 repeats turn-on and turn-off of the corresponding optical module 122. Since the beams are repeatedly turned on/off in the region in which the obstacle is present, the driver is visually evoked to pay more attention to the obstacle, and thus the visibility of the obstacle is heightened.

Figure 6A:
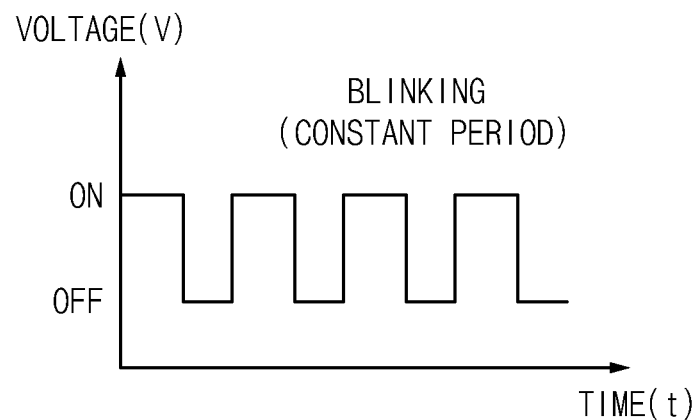
FIGS. 6A and 6B are diagrams illustrating a blink period of a head lamp system according to an exemplary embodiment of the present invention.
Figure 6B:
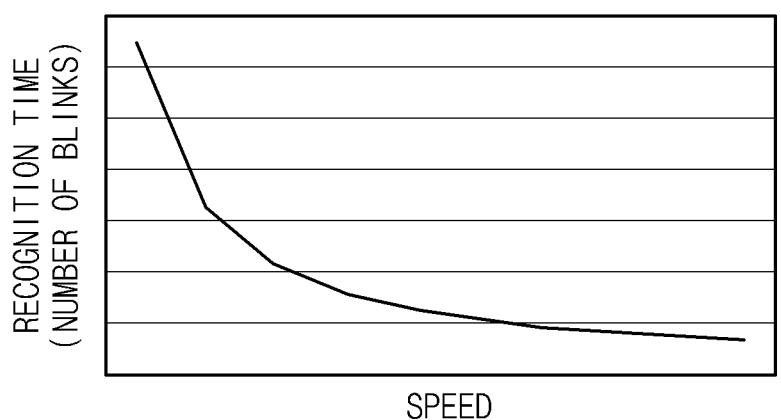

On the other hand, if the blink period of the optical module 122 is constantly set as shown in FIG. 6A, the blink period is decreased as the vehicle speed is increased. Due to this, the probability that the driver can confirm the obstacle may be rather lowered. Specifically, if the distance between the vehicle and the obstacle is constant and the blink period is constant, the optical module blinks 12 times per second in a low-speed section (for example, in a section where the vehicle speed is 30 km/h or less), blinks 6 times per second in a middle-speed section (for example, in a section in which the vehicle speed is 30 km/h to 90 km/h), and blinks 4 times per second in a high-speed section (for example, in a section in which the vehicle speed is 90 km/h or more). That is, if the vehicle speed is increased, as shown in FIG. 6B, the number of blinks is non-linearly decreased. Accordingly, if the blink period is set to be the same regardless of the vehicle speed, the driver can sufficiently recognize the obstacle in the case where the vehicle travels at a speed in the low-speed section in which the number of blinks is large. However, if the vehicle travels at a speed in the middle-speed section or in the high-speed section in which the number of blinks is small, the driver may not sufficiently recognize the obstacle.

Figure 7:
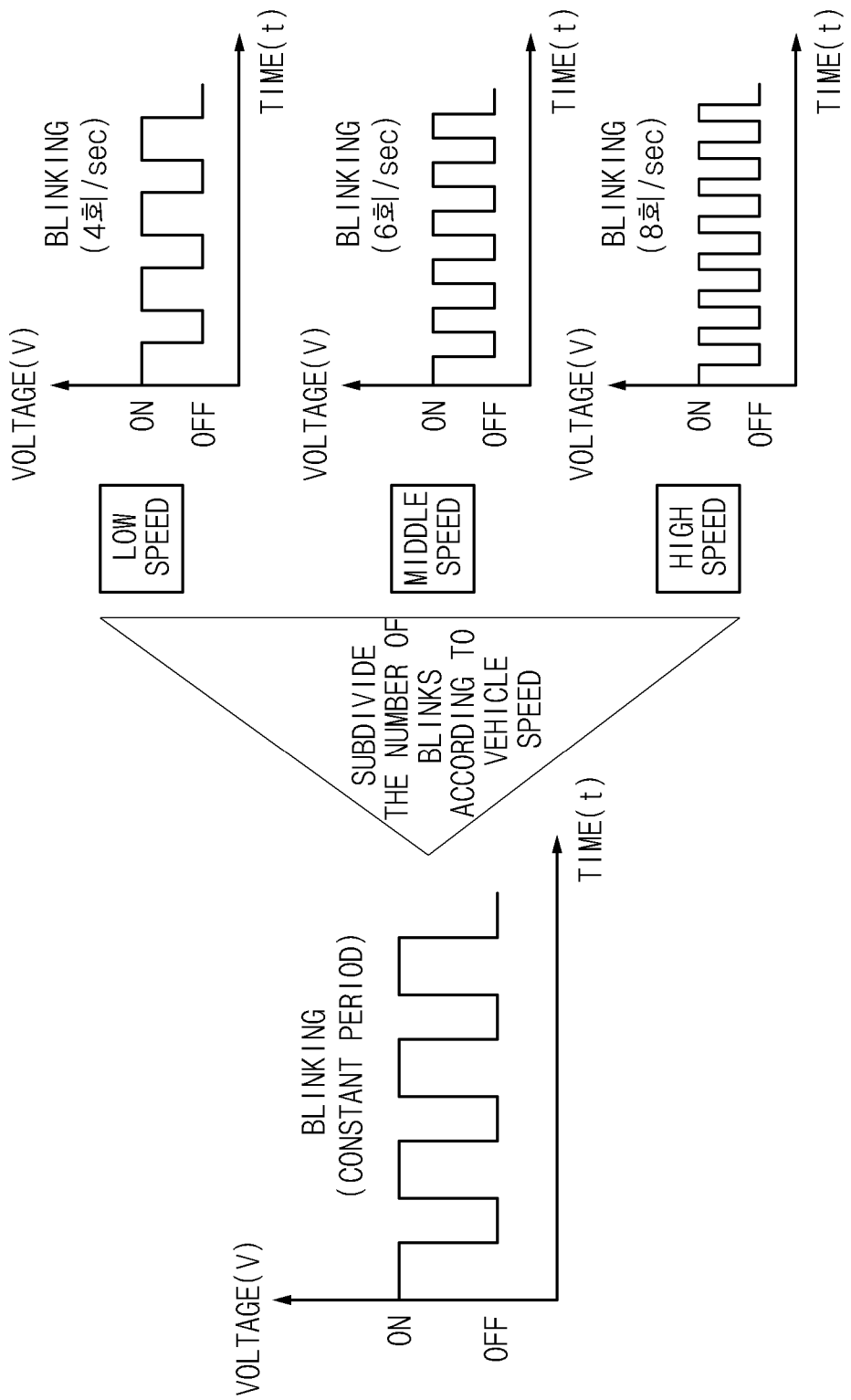
FIG. 7 is a diagram illustrating the change of a blink period of a head lamp system according to an exemplary embodiment of the present invention.

According to the exemplary embodiment of the present invention, the optical module, which has the irradiation region that corresponds to the position in which the obstacle is present, blinks, and by changing the blink period in consideration of the vehicle speed measured by the speed sensing means 400, the driver can sufficiently recognize the obstacle. Specifically, as illustrated in FIG. 7, the blink period is controlled to be increased in proportion to the speed of the vehicle in the low-speed section, in the middle-speed section, and in the high-speed section.

Figure 8A:
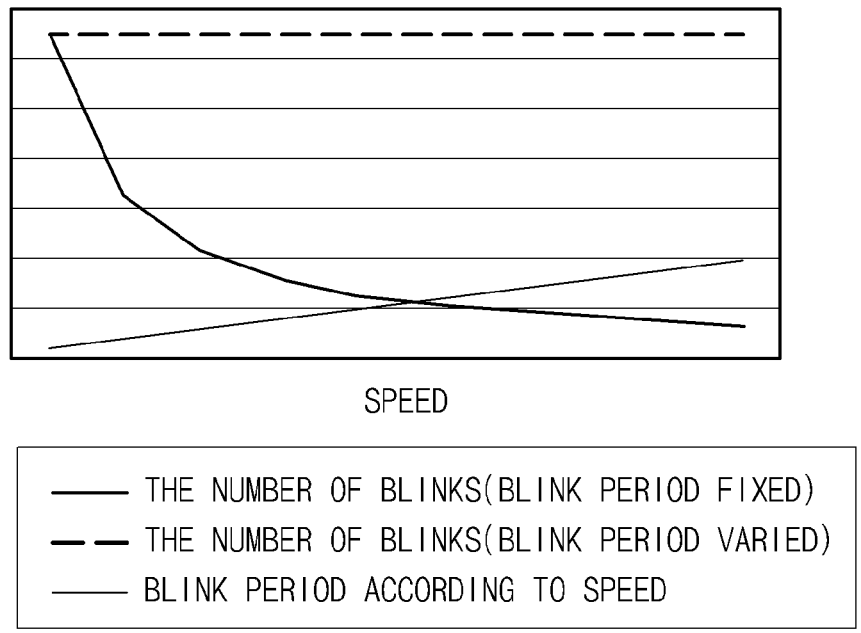
FIGS. 8A to 11B are diagrams illustrating diverse examples of variation of the blink period of the head lamp system according to an exemplary embodiment of the present invention.
Figure 8B:
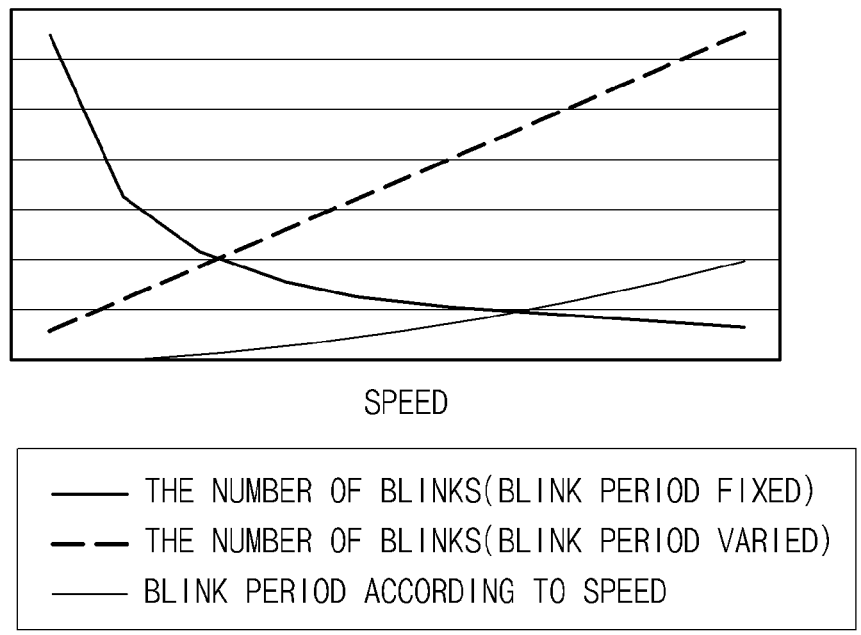

That is, as illustrated in FIG. 8A, if the relationship between the blink period and the vehicle speed is set to blink period=$\alpha$ speed ($\alpha$ is constant), the blink period is increased as the vehicle speed is increased, but the number of blinks becomes constant regardless of the vehicle speed. Further, as illustrated in FIG. 8B, if the relationship between the blink period and the vehicle speed is set to blink period=$\alpha$ speed$^\beta$ ($\alpha$ and $\beta$ are constant), both the blink period and the number of blinks are increased as the vehicle speed is increased. Accordingly, the driver can certainly recognize the obstacle even though the vehicle speed is increased.

Figure 9A:
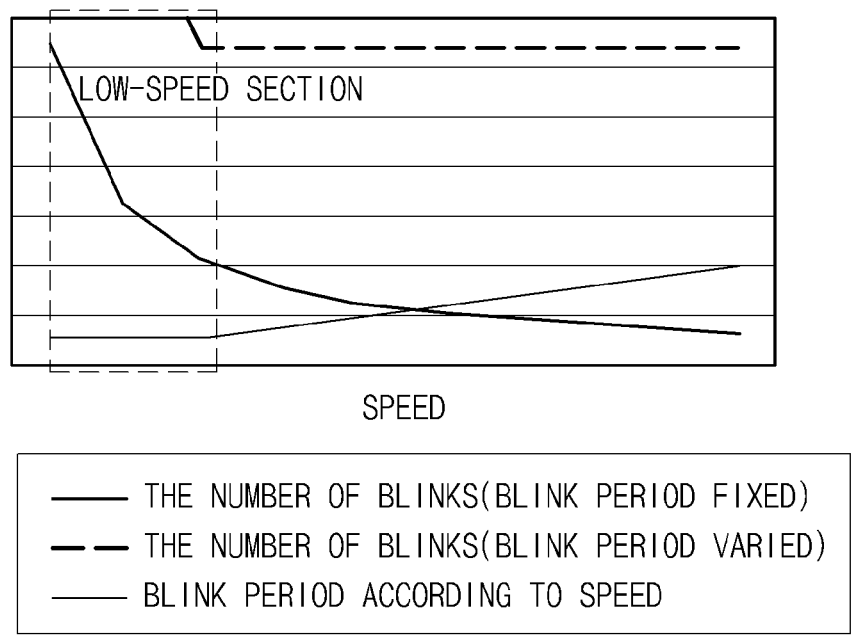
Figure 9B:
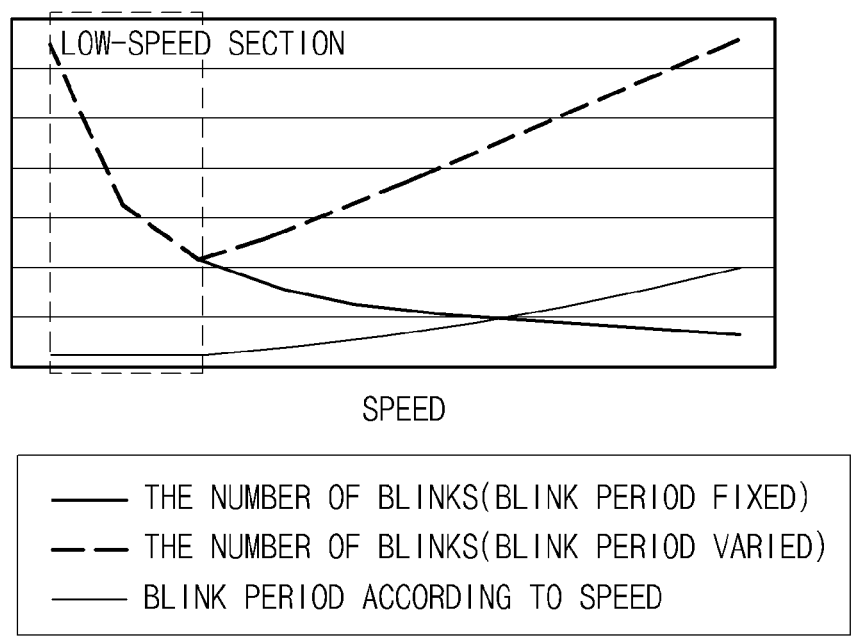

Further, as illustrated in FIGS. 9A and 9B, it may be set that the blink period is constant in the low-speed section regardless of the vehicle speed, and the relationship between the blink period and the vehicle speed illustrated in FIGS. 8A and 8B is applied to the middle-speed section and the high-speed section only. Since the decrease of the number of blinks according to the increase of the speed is not large even though the blink period is constant in the low-speed section, the driver can certainly recognize the obstacle in the low-speed section even without changing the blink period according to the vehicle speed.

Figure 10A:
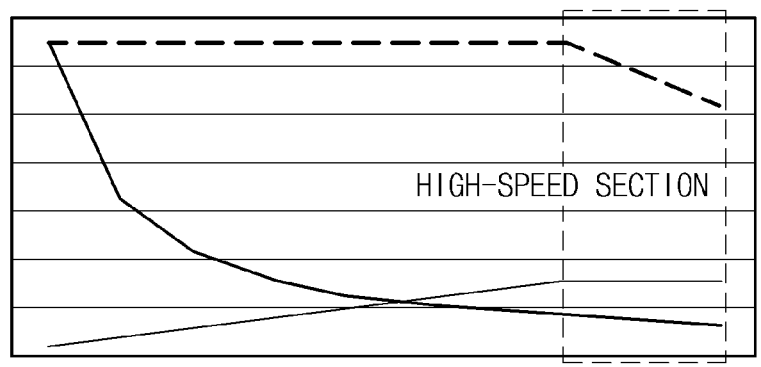
Figure 10B:
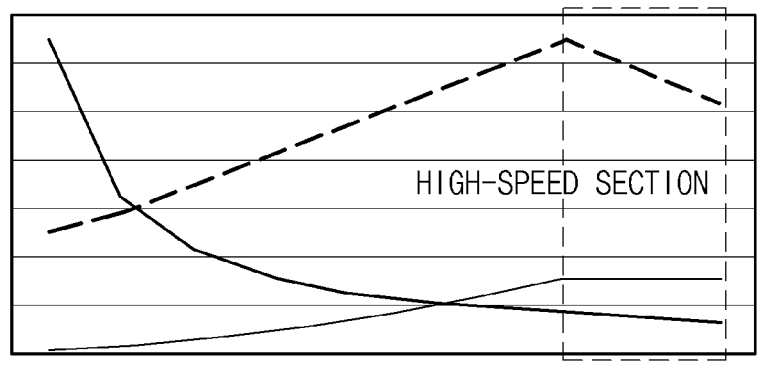

Further, as illustrated in FIGS. 10A and 10B, it may be set that the blink period is constant in the high-speed section regardless of the vehicle speed, and the relationship between the blink period and the vehicle speed illustrated in FIGS. 8A and 8B is applied to the low-speed section and the middle-speed section only. If the blink period is increased as the vehicle speed is increased in the high-speed section as illustrated in FIGS. 8A and 8B, the blink period becomes too short in the high-speed section, and this may cause the driver to feel dazzling or unpleasant. Accordingly, as illustrated in FIGS. 10A and 10B, by decreasing the number of blinks according to the increase of the vehicle speed in the high-speed section through making the blink period constant only in the high-speed section regardless of the vehicle speed, the driver is prevented from feeling dazzling or unpleasant.

Figure 11A:
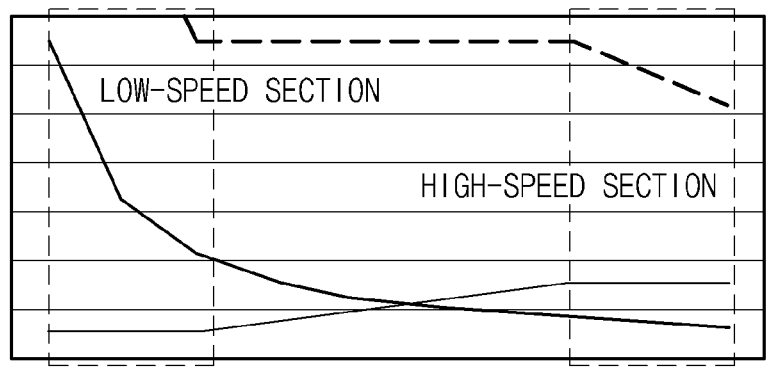
Figure 11B:
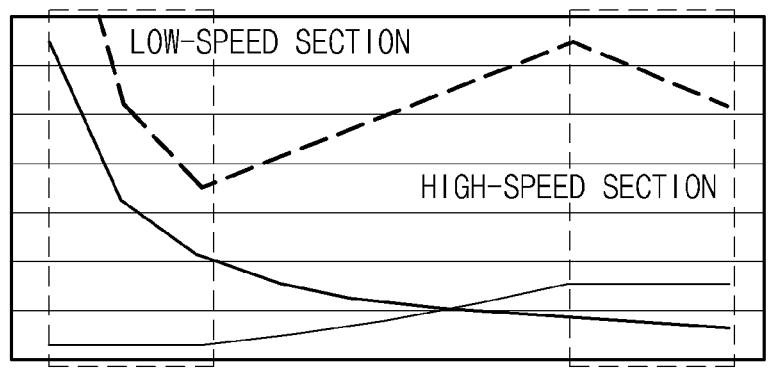

Further, as illustrated in FIGS. 11A and 11B, it may be set that the blink period is constant in the low-speed section and in the high-speed section regardless of the vehicle speed, and the relationship between the blink period and the vehicle speed illustrated in FIGS. 8A and 8B is applied to the middle-speed section only.

As described above, according to an exemplary embodiment of the present invention, by sensing the position of the obstacle that is present in the front direction of the vehicle during the nighttime driving and making beams blink with respect to the irradiation region that corresponds to the sensed position, the driver can recognize the presence of the obstacle more efficiently.

Further, according to an exemplary embodiment of the present invention, by changing the blink period of the beams irradiated onto the position in which the obstacle is present according to the vehicle speed, the driver can easily recognize the obstacle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A head lamp system comprising:
   a head lamp that is provided with a headlight and a spotlight unit including a plurality of optical modules having different irradiation regions in front of a vehicle,
   wherein an optical module of the plurality of optical modules, which has an irradiation region that corresponds to a position of an obstacle in front of the vehicle, blinks, and a blink period of the optical module is changed according to a vehicle speed.

2. The head lamp system according to claim 1, wherein the blink period of the optical module of the spotlight unit is in proportion to the vehicle speed, and the number of blinks is the same.

3. The head lamp system according to claim 2, wherein the blink period of the optical module of the spotlight unit is constant in a first predetermined speed section.

4. The head lamp system according to claim 2, wherein the blink period of the optical module of the spotlight unit is constant in a second predetermined speed section.

5. The head lamp system according to claim 2, wherein the blink period of the optical module of the spotlight unit is constant in a first predetermined speed section and in a second predetermined speed section, wherein the vehicle speed in the second predetermined speed section is higher than the vehicle speed in the first predetermined speed section.

6. The head lamp system according to claim 1, wherein the blink period and the number of blinks of the optical module of the spotlight unit are in proportion to the vehicle speed.

7. The head lamp system according to claim 6, wherein the blink period of the optical module of the spotlight unit is constant in a first predetermined speed section.

8. The head lamp system according to claim 6, wherein the blink period of the optical module of the spotlight unit is constant in a second predetermined speed section.

9. The head lamp system according to claim 6, wherein the blink period of the optical module of the spotlight unit is constant in a first predetermined speed section and in a second predetermined speed section, wherein the vehicle speed in the second predetermined speed section is higher than the vehicle speed in the first predetermined speed section.

* * * * *